US012606062B2

(12) United States Patent
Lee et al.

(10) Patent No.: US 12,606,062 B2
(45) Date of Patent: Apr. 21, 2026

(54) SEAT FOLDING SYSTEM AND METHOD OF CONTROLLING SEAT FOLDING SYSTEM

(71) Applicants: Hyundai Motor Company, Seoul (KR); Kia Corporation, Seoul (KR)

(72) Inventors: Dong Hoon Lee, Seoul (KR); Sang Soo Lee, Hwaseong-si (KR); Sang Hark Lee, Incheon (KR); Yo Han Kim, Ansan-si (KR); Mun Seung Kang, Suwon-si (KR); Deok Soo Lim, Hwaseong-si (KR); Kug Hun Han, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 259 days.

(21) Appl. No.: 18/198,525

(22) Filed: May 17, 2023

(65) Prior Publication Data

US 2024/0190306 A1 Jun. 13, 2024

(30) Foreign Application Priority Data

Dec. 8, 2022 (KR) ........................ 10-2022-0170392

(51) Int. Cl.
*B60N 2/20* (2006.01)
*B60N 2/02* (2006.01)
*B60N 2/18* (2006.01)
*B60N 2/30* (2006.01)
*B60N 2/62* (2006.01)
*B60N 2/06* (2006.01)

(52) U.S. Cl.
CPC ........... *B60N 2/20* (2013.01); *B60N 2/02246* (2023.08); *B60N 2/185* (2013.01); *B60N*

*2/309* (2013.01); *B60N 2/62* (2013.01); *B60N 2/0224* (2013.01); *B60N 2/0252* (2013.01); *B60N 2/065* (2013.01)

(58) Field of Classification Search
CPC .... B60N 2/0224; B60N 2/065; B60N 2/3095; B60N 2/10; B60N 2/01; B60N 2/0252; B60N 2/20; B60N 2002/0055
See application file for complete search history.

(56) References Cited

U.S. PATENT DOCUMENTS

| | | | | |
|---|---|---|---|---|
| 4,669,780 A | * | 6/1987 | Sakakibara | ........ B61D 33/0021 |
| | | | | 296/64 |
| 2002/0125757 A1 | | 9/2002 | LeTournoux | |
| 2008/0009958 A1 | * | 1/2008 | Abt | .................... B64D 11/0643 |
| | | | | 700/29 |

(Continued)

FOREIGN PATENT DOCUMENTS

| | | |
|---|---|---|
| CN | 204488559 U | 7/2015 |
| JP | 2001001814 A | 1/2001 |

(Continued)

*Primary Examiner* — Syed A Islam
(74) *Attorney, Agent, or Firm* — Banner & Witcoff, Ltd.

(57) ABSTRACT

A seat folding system includes a folding seat having a seat plate and a backrest, a folding seat adjustment unit having a seat plate adjustment unit for adjusting a height of the seat plate, a slide adjustment unit for adjusting a position of the seat plate in a forwards and backwards direction, and a backrest folding seat adjustment unit for adjusting an angle of the backrest, and a control unit for controlling the folding seat adjustment unit such that folding is able to start in a reference state in which the folding seat is preset.

11 Claims, 13 Drawing Sheets

(56)  References Cited

U.S. PATENT DOCUMENTS

| | | | |
|---|---|---|---|
| 2011/0193388 A1 | 8/2011 | Ventura et al. | |
| 2016/0280096 A1* | 9/2016 | Bonk | B60N 2/02246 |
| 2022/0111771 A1 | 4/2022 | Lee et al. | |
| 2022/0355710 A1* | 11/2022 | Salter | B60N 2/0025 |

FOREIGN PATENT DOCUMENTS

| | | | |
|---|---|---|---|
| KR | 101082867 B1 | 11/2011 | |
| WO | 2008064484 A1 | 6/2008 | |

* cited by examiner 20        100        10

140

120

410

440

110

130

300

420

430

200

SEAT FOLDING SYSTEM AND METHOD OF CONTROLLING SEAT FOLDING SYSTEM

CROSS-REFERENCE TO RELATED APPLICATIONS

This application claims benefit of priority to Korean Patent Application No. 10-2022-0170392 filed on Dec. 8, 2022 in the Korean Intellectual Property Office, the disclosure of which is incorporated herein by reference in its entirety.

TECHNICAL FIELD

The present disclosure relates to a seat folding system and a method of controlling a seat folding system.

BACKGROUND

Seats for occupants, such as a driver's seat and/or a passenger seat, are provided in vehicles. A position, an angle, and/or an inclination of a backrest of a seat may be adjusted to suit physical conditions of an occupant.

A method of adjusting a seat may include a manual method in which an occupant may adjust the seat by applying force while the occupant manually releases the engaged state of a latch, and/or an electric method in which an occupant may adjust a seat by driving a motor simply by the occupant operating a button.

Generally, in a vehicle having three or more rows of seats, such as a sport utility vehicle, the electric method may be applied only to a driver's seat and a passenger seat, but recently, the electric method may be applied to a driver's seat and a passenger seat, and also to a second row seat.

The seat adjustment of the electric method may include a function of sliding a seat forward or backward, a function of adjusting a height of a seating plate of a seat, a function of adjusting an angle of a leg-rest, and/or a recliner function of adjusting an angle of backrest of a seat.

In a vehicle having three or more rows of seats in a vehicle, the backrests of the second row seat and the third row seat, etc., may be folded so as to form a flat surface, such that cargo may be loaded thereon.

However, when the position of the second row seat is adjusted due to the addition of the electric function of the second row seat as described above, it may be difficult to form a flat surface on which cargo may be loaded. Accordingly, a user may have to adjust the second row seat again to form the flat surface, which may be inconvenient.

SUMMARY

The following summary presents a simplified summary of certain features. The summary is not an extensive overview and is not intended to identify key or critical elements.

Systems, apparatuses, and methods are described for a seat folding system and controlling of the seat folding system. A seat folding system may comprise a folding seat comprising a seat plate and a backrest, a folding seat adjustment unit and a control unit configured to control the folding seat adjustment unit to cause the folding seat to be in a preset reference state before folding of the folding seat is enabled. The folding seat adjustment unit may comprise a seat plate adjustment unit configured to adjust a height of the seat plate, a slide adjustment unit configured to adjust a position of the seat plate in a forwards or backwards direction, wherein the forwards direction is a direction in which the seat plate extends from the backrest when the folding seat is in an unfolded state, and wherein the backwards direction is opposite to the forwards direction, and a backrest adjustment unit configured to adjust an angle of the backrest.

A method of controlling a seat folding system may comprise receiving seat folding signals, preparing a folding seat for folding by placing the folding seat in a predetermined reference state by controlling a folding seat adjustment unit, and performing folding of the folding seat. These and other features and advantages are described in greater detail below.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
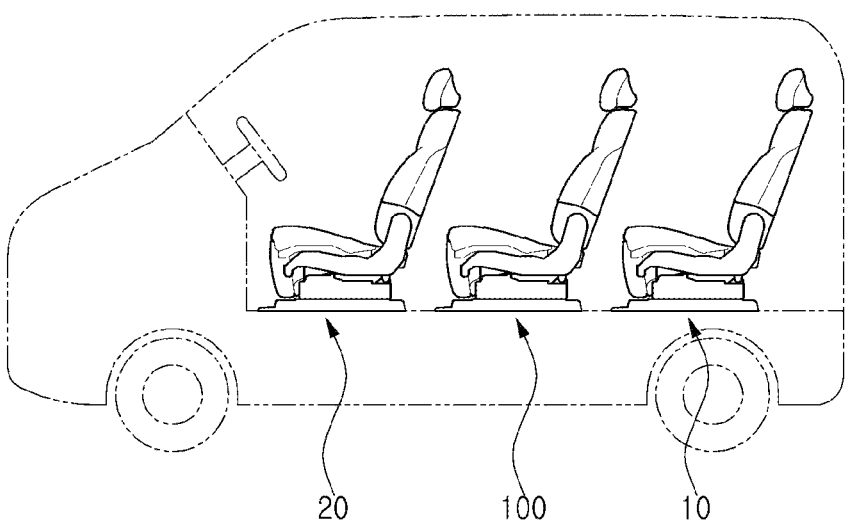
FIG. 1 is a cross-sectional diagram illustrating a vehicle having three rows of seats, viewed laterally.

Hereinafter, examples of the present disclosure will be described with reference to the attached drawings.

Elements having the same function in the scope of the same concept represented in the drawings of each example will be described using the same reference numeral.

The terms "first," "second," and the like may be used to distinguish one element from the other, and may not limit a sequence and/or an importance, or others, in relation to the elements. In some cases, a first element may be referred to as a second element, and similarly, a second element may be referred to as a first element without departing from the scope of the disclosure.

The terms "include," "comprise," "have," or the like of the description are used to indicate the presence of features, numbers, steps, operations, elements, parts or combination thereof, and do not exclude the possibilities of combination or addition of one or more features, numbers, steps, operations, elements, parts or combination thereof.

Unless otherwise defined, all terms used herein, including technical or scientific terms, have the same meanings as those which would be generally understood by those with ordinary knowledge in the field of art to which the present disclosure belongs. Terms such as those defined in a generally used dictionary are to be interpreted as having meanings equal to the contextual meanings in the relevant field of art, and are not to be interpreted as having ideal or excessively formal meanings unless clearly defined as having such in the present application.

Figure 2:
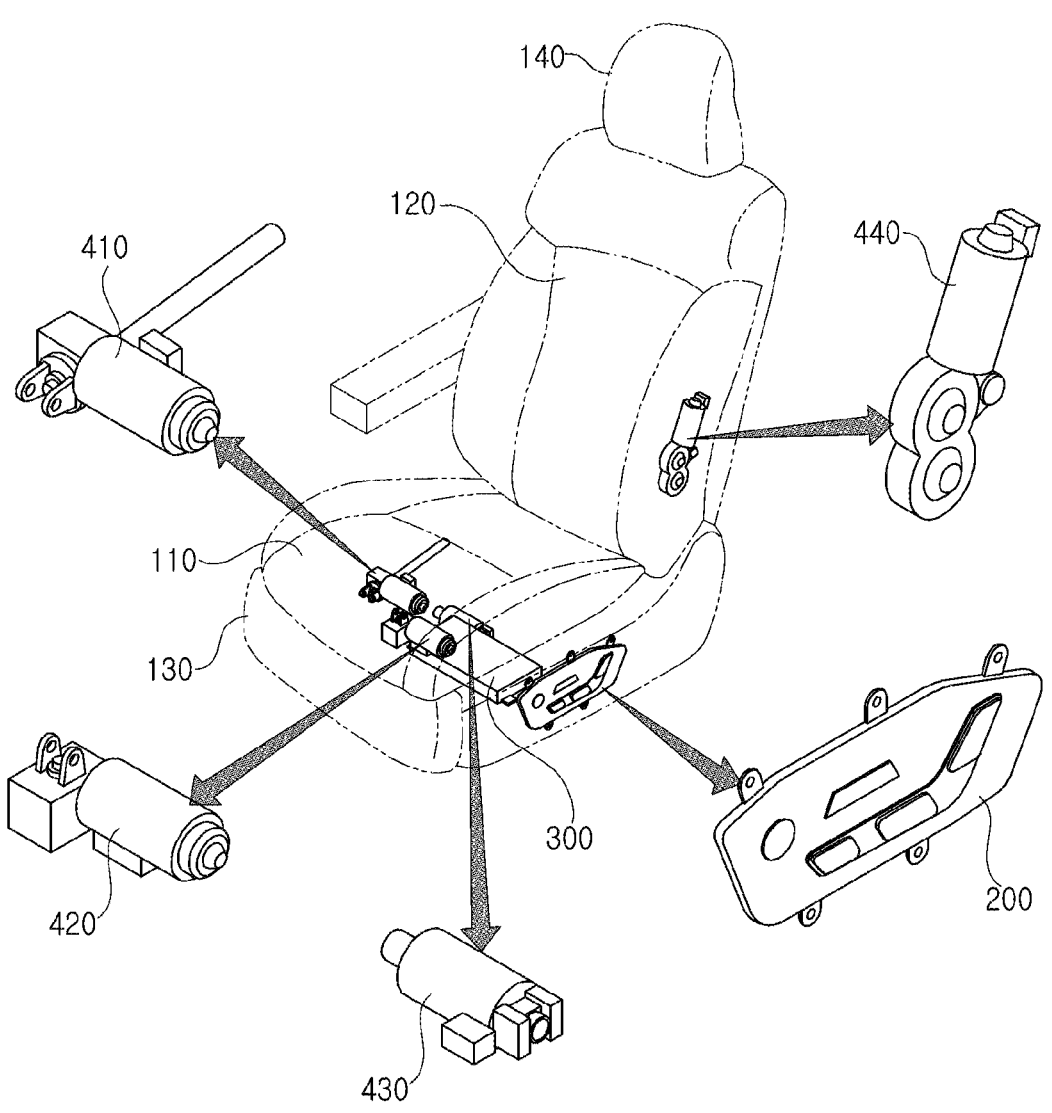
FIG. 2 is a diagram illustrating a seat folding system according to an example of the present disclosure.
Figure 3:
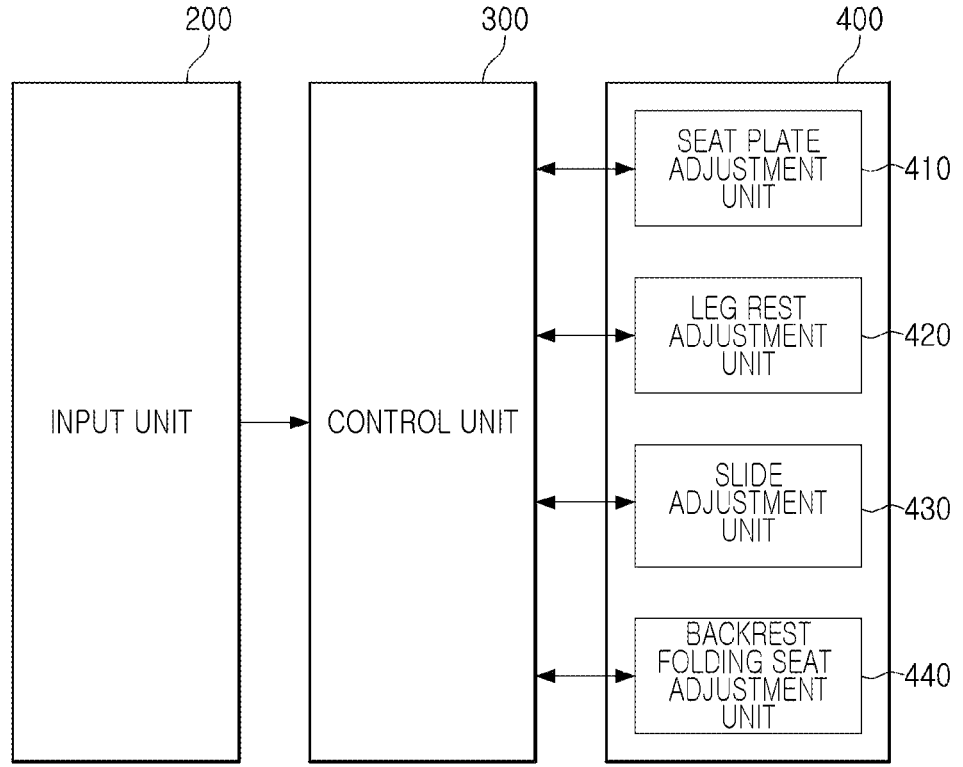
FIG. 3 is a block diagram illustrating a seat folding system according to an example of the present disclosure.
Figure 4:
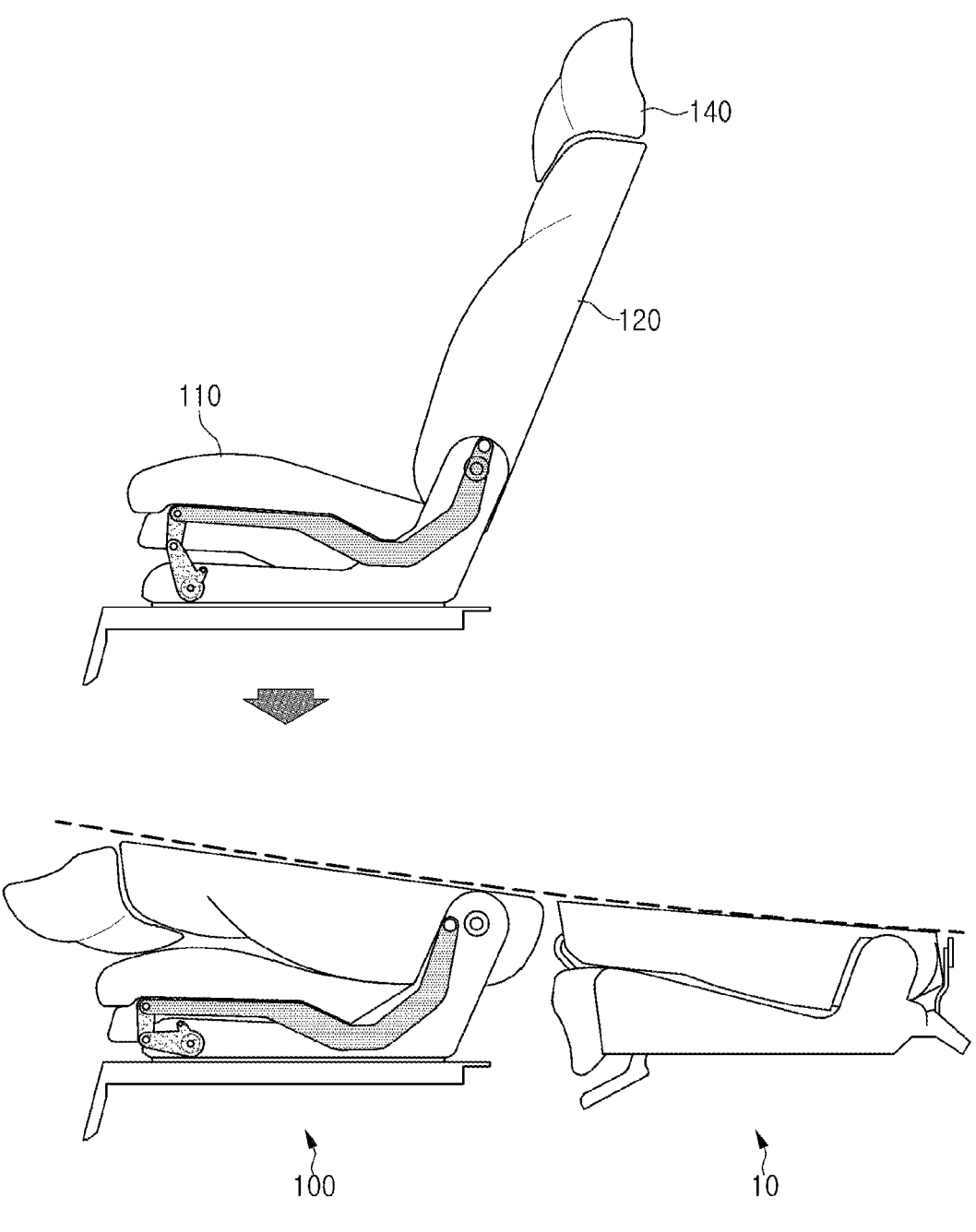
FIG. 4 is a diagram illustrating a folded state of a seat according to the prior art.
Figure 5A:
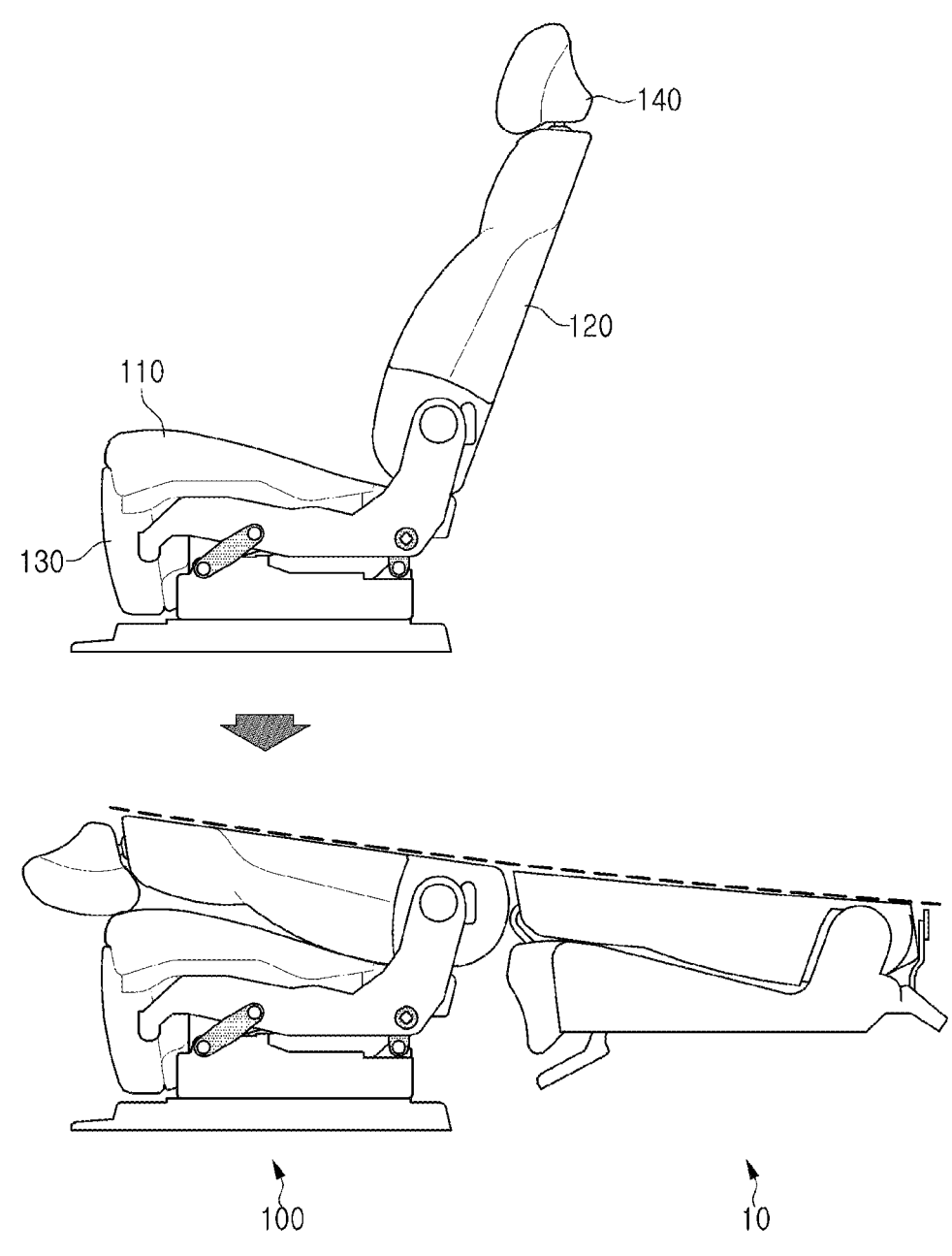
FIG. 5A is a diagram illustrating a folded state of a seat according to an embodiment of the present disclosure.
Figure 5B:
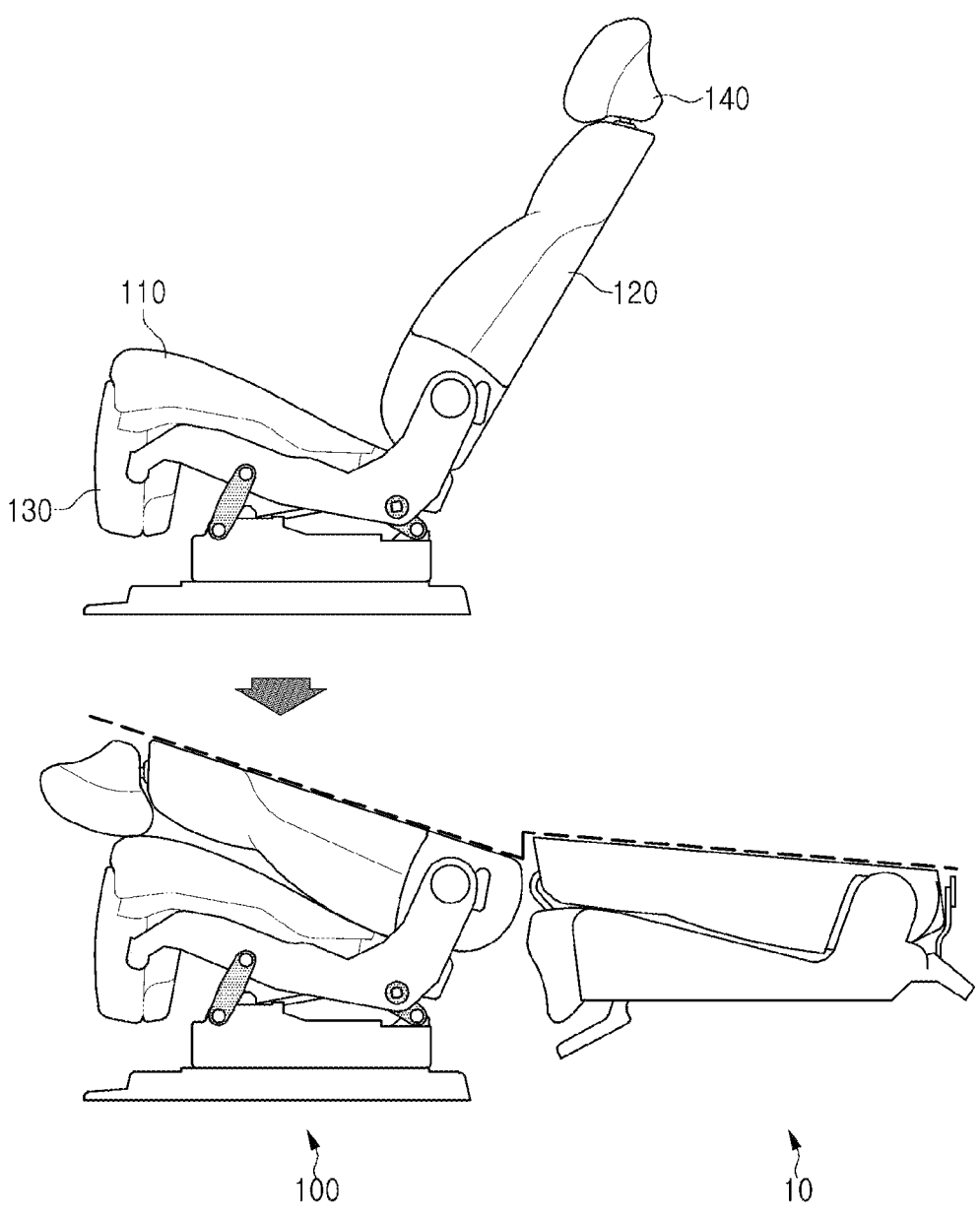
FIG. 5B is a diagram illustrating a folded state of a seat according to a comparative example.
Figure 6:
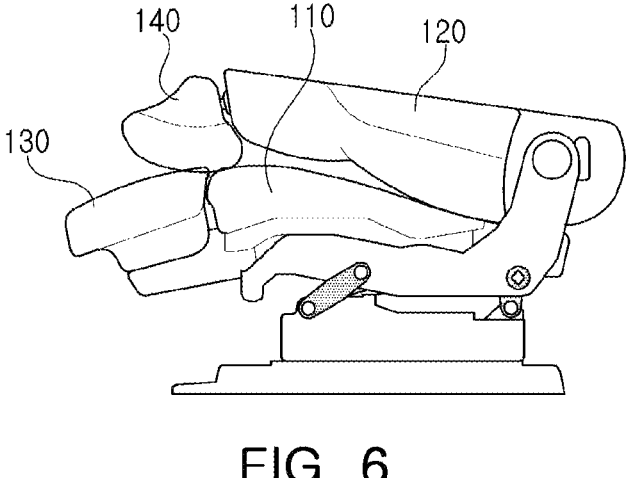
FIG. 6 is a diagram illustrating interference between a leg rest 130 and a headrest 140 according to a comparative example.

FIG. 1 is a cross-sectional diagram illustrating a vehicle having three rows of seats, viewed laterally. FIG. 2 is a diagram illustrating a seat folding system according to an example of the present disclosure. FIG. 3 is a block diagram illustrating a seat folding system according to an example of the present disclosure. FIG. 4 is a diagram illustrating a folded state of a seat according to the prior art. FIG. 5A is a diagram illustrating a folded state of a seat according to an example of the present disclosure. FIG. 5B is a diagram illustrating a folded state of a seat according to a comparative example. FIG. 6 is a diagram illustrating interference between a leg rest 130 and a headrest 140 according to a comparative example.

Referring to FIG. 1, in a vehicle having three rows of seats, the seats in the first row may be a driver's seat or a passenger seat, and passengers may sit on the seats in the second and third rows, or space for loading cargo may be secured by folding the backrests of the second and/or third row seats so as to form a flat surface. A vehicle having three rows of seats will be described in the following, but the examples may also be applicable to a vehicle having three or more rows of seats or two rows of seat (e.g., a passenger seat may be foldable to align with a folded second row seat). In general, the following allows a folding seat to form a substantially flat surface with a folded seat behind it (e.g., a rear seat). In the following examples, a seat on which folding control of the seat folding system is applied will be referred to as a folding seat. A seat disposed on a front side of the folding seat will be referred to as a front seat and a seat disposed on a rear side of the folding seat will be referred to as a rear seat. For example, in a vehicle having three rows illustrated in FIG. 1, folding control may be performed on the second row seat, which will therefore be referred to as a folding seat 100, and, with respect to the folding seat 100, the first row seat disposed on a front side will be referred to as a front seat 20, and the third row seat placed on the rear side may be referred to as a rear seat 10.

In a general three-row vehicle, it may be possible to adjust the folding seat 100 differently from the front seat 20 (e.g., a driver's seat or passenger seat). Referring to FIG. 4, generally, when the folding seat 100 is folded, a flat surface may be formed together with the folded rear seat 10. In some cases, the folding seat 100, similarly to the front seat 20, may be configured to have a height of the seat plate 110 and/or the angle of the backrest 120 adjusted. Additionally, a leg rest 130 may be further provided, and a function of adjusting the angle of the leg rest 130 may generally be provided. Referring to FIGS. 5A, 5B and 6, because the control function of the folding seat 100 is multifaceted, when the folding seat 100 is folded, depending on a state of the folding seat 100 during folding, either a flat surface may be formed with the rear seat 10 (e.g., FIG. 5A) or an irregular surface may be formed (e.g., FIG. 5B or FIG. 6). As illustrated in FIG. 5A, in a specific state, a flat surface may be formed with the rear seat 10 even when the backrest 120 is simply (e.g., without further adjustment or controlling of the folding chair 100) folded. However, as illustrated in FIG. 5B, depending on how a user of the folding seat 100 manipulates the seat (e.g., tilting the seat plate 110 and back rest 120), a flat surface may not be formed with the rear seat 10 when the folding seat 100 is folded. As illustrated in FIG. 6, in a case that the leg rest 130 is extended, the leg rest 130 and the headrest 140 may interfered with each other such that folding may not be completely performed. In the states illustrated in FIGS. 5B to 6, it would be inconvenient for the user to manipulate folding seat before folding or the folded surface of the folding seat 100 to coincide with (e.g., align with) the folded surface of the rear seat 10 through a separate manipulation before folding the folding seat. By adjusting the state of the folding seat 100 (e.g., from the states illustrated in FIGS. 5B to 6 to a state illustrated in FIG. 5A or to another neutral state) and folding the seat, a flat surface may be formed with the folded rear seat 10. Accordingly, in the seat folding system and the method of controlling a seat folding system according to the present disclosure, when the user folds the folding seat 100, the folding seat 100 may be automatically adjusted to form a flat folded surface with the rear seat 10. The examples are described with reference to a vehicle with three rows of seats, but an example thereof is not limited thereto, and the examples and concepts discussed herein may also be applied to vehicles with three or more rows. Also, other states of the folding seat before folding that may impede folding flat with a folded rear seat 10 may also be considered, such as a state of the folding seat 100 in which there is interference with the front seat 20 with respect to the folding seat 100 (e.g., on which the folding control may be performed). The states may be identified and a folding control may be performed such that the folding seat may be folded to have a substantially flat surface with a folded rear seat 10.

Referring to FIG. 2, a seat folding system of a vehicle according to an example may include a folding seat 100 and a folding seat adjustment unit 400. The folding seat 100 may include a seat plate 110 on which a user may sit, a backrest 120 rotatably connected to one side of the seat plate 110 and configured to support the user's back, a leg rest 130 rotatably connected to the other side of the seat plate 110 e.g., opposite to the side connected to the back rest 120) and configured to support the user's legs, and a headrest 140 connected to a side of the backrest 120 (e.g., opposite a side of the backrest 120 connected to the seat plate 110) and configured to support the user's head.

The folding seat adjustment unit 400 may include a seat plate adjustment unit 410, a leg rest adjustment unit 420, a slide adjustment unit 430, and a backrest folding seat adjustment unit 440. The seat plate adjustment unit 410 may be configured to adjust the height of the seat plate 110 and/or the angle of the seat plate 110. The leg rest adjustment unit 420 may be configured to adjust the angle of the leg rest 130 coupled (e.g., rotatably) to the end of the seat plate 110. The slide adjustment unit 430 may be configured to move the seat forward and/or backward. The backrest folding seat adjustment unit 440 may be configured to adjust the angle of the backrest 120 rotatably coupled to the seat plate 110.

Referring to FIGS. 2 and 3, the seat folding system of a vehicle according to an example may include an input unit 200 for inputting a user's intention to adjust the height and/or angle of the seat plate 110, the front and rear positions of the seat plate 110, the angle of the leg rest 130, and/or the angle of the backrest 120. The input unit 200 may be configured to receive a user's intention (e.g., input, selection, etc.) to fold the seat, and may receive state information of the seats disposed on the front and/or rear sides (e.g., the front seat 20 and the rear seat 10). The input unit 200 may be provided on a lower end of the side surface of the seat, but an example thereof is not limited thereto, and at least one input unit 200 may be provided in at least one of various positions, such as a cluster including a display and/or a trim portion of a rear tailgate. The input unit 200 may comprise, e.g., a touch pad, a switch, and/or a button, and a user may input a folding intention by manipulating the touch pad, the switch, and/or the button. For example, a seat folding button may be provided in a portion of the vehicle, and a user may press the seat folding button when wanting to fold the seat. Also, the input unit 200 may receive information about the posture and/or position of the front seat 20 and/or the rear seat 10. For example, by receiving the position information of the front seat 20, it may be determined whether the folding seat 100 is in a position in which the front seat 20 interferes with the headrest 140 when the folding seat 100 is folded.

The seat folding system according to an example may include a control unit 300.

The control unit 300 may be configured to control the folding seat adjustment unit based on information received from the input unit 200. The control unit 300 may determine whether folding may be performed by identifying the positions of the front seat 20 and the rear seat 10 and the state of the vehicle (e.g., whether it is traveling). Also, when the control unit 300 confirms that the folding may be performed, the folding seat 100 may be controlled by the folding seat adjustment unit 400 to become folded (e.g., caused to fold) such that the folded surface of the folding seat 100 is substantially flat with the rear seat 10 when folded.

The control unit 300 may recognize the current state (angle, position, or the like) of each folding seat adjustment unit 400. Each folding seat adjustment unit 400 may adjust the folding seat 100 to a position and/or posture in which a folded surface thereof is substantially flat with the rear seat 10 when folded, depending on the position of each folding seat adjustment unit 400. For example, depending on the type of vehicle, the position in which the rear seat 10 and the folded surface are substantially flat may be limited. Here, the state in which the rear seat 10 and the folded surface of the folding seat 100 would be flat if the folding seat 100 were folded may be referred to as a reference state. The height of the seat plate 110, the angle of the leg rest 130, and the front and rear position of the seat plate 110 in the reference state may be predetermined and stored. The folding seat adjustment unit 400 may comprise a motor, e.g., a motor including a hall sensor (not illustrated). The control unit 300 may identify the rotation direction and the number of rotations of each folding seat adjustment unit 400 to determine a state (e.g., the current position and/or posture) of the folding seat 100, and may control the state to be the reference state (e.g., cause the folding seat adjustment unit 400 to drive the seat to the reference state). Also, the method for the control unit 300 to move the folding seat adjustment unit 400 to the reference state is not limited to identifying and adjusting the rotation direction and the number of rotations of each folding seat adjustment unit. Also, or alternatively, another sensor may be included (e.g., distance sensor) and may be used to determine the state (e.g., position and/or posture) of each seat. The state may be adjusted to the reference state. Also, the reference state may be determined based on a point of the folding seat 100 (e.g., a predetermined reference point of the folding seat 100). For example, based on the rotatably coupled axis of the seat plate 110 and the backrest 120 (e.g., hinge coupling portion), the reference state in which a flat surface is formed when folded with the rear seat, and information on the height and the front and rear position of the position of the axis coupled to be rotatable in the reference state may be determined (e.g., in advance of folding the folding seat 100).

The control unit 300 may be configured to implement an algorithm configured to control operations of the various components of the seat folding system. The control unit may comprise a non-volatile memory (not illustrated) configured to store data relating to software instructions for reproducing and/or implementing the algorithm. The data relating to software instructions for reproducing and/or implementing the algorithm may be stored on non-transferable a computer-readable medium. The control unit 300, and/or any of the folding seat adjustment units, may comprise a processor (not illustrated) configured to perform operations described below using data stored in a memory thereof (e.g., by executing the instructions stored on the non-volatile memory and/or instructions stored on the non-transferable computer readable medium). The memory and the processor may be implemented as individual chips. Alternatively, the memory and processor may be implemented as an integrated single chip. A processor may include one or more processors.

The components included in the seat folding system may be connected in a wired and/or wireless manner and may exchange information via the connection. For example, the components may exchange information using communication means such as Ethernet, media-oriented systems transport (MOST), Flexray, controller area network (CAN), local interconnect network (LIN), Internet, LTE, 5G, Wi-Fi (Wi-Fi), Bluetooth, NFC (near field communication), ZigBee®, RF (radio frequency).

Figure 7:
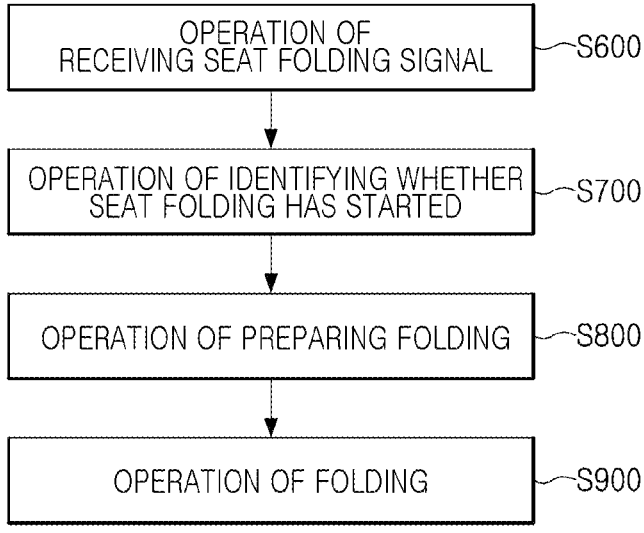
FIG. 7 is a flowchart illustrating controlling of a seat folding system according to an example of the present disclosure.
Figure 14:
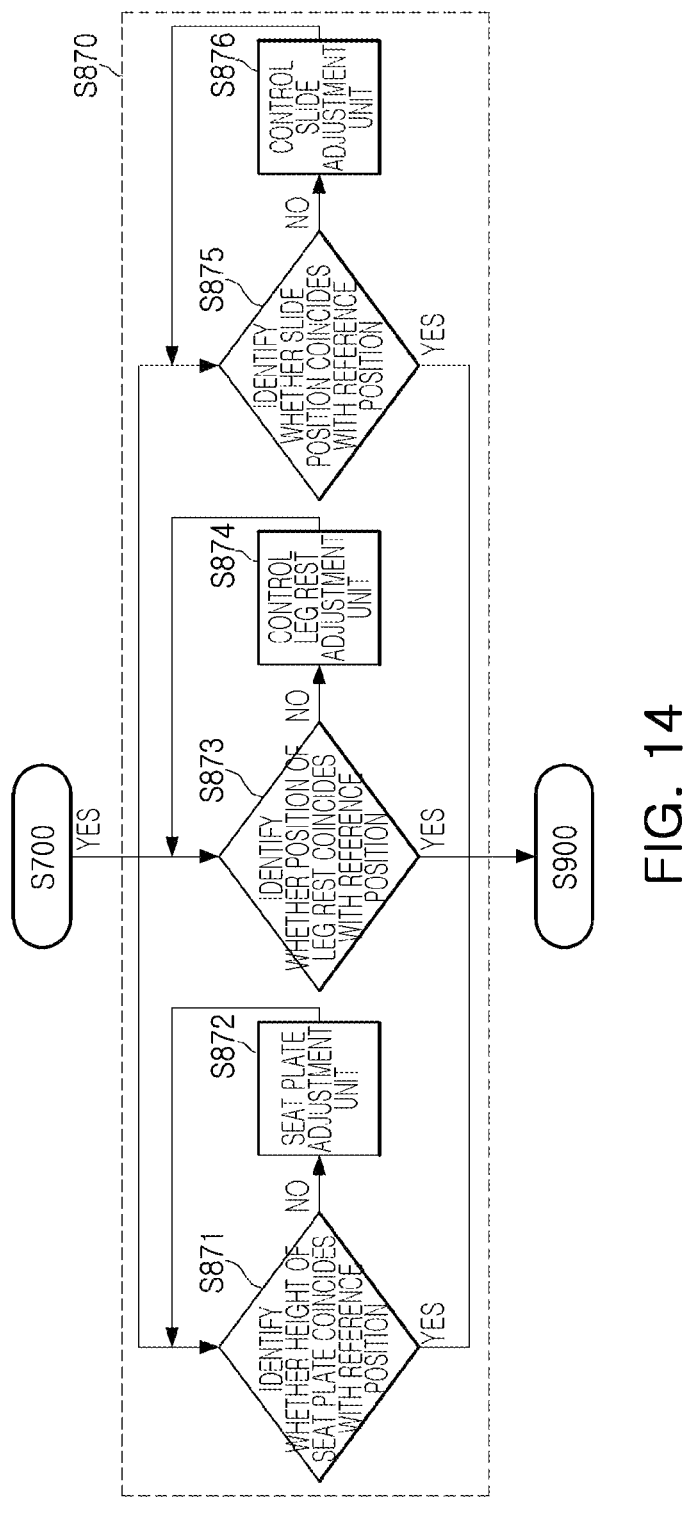
FIG. 14 is a flowchart illustrating operation S870 of a seat folding system according to an example of the present disclosure.
Figure 15:
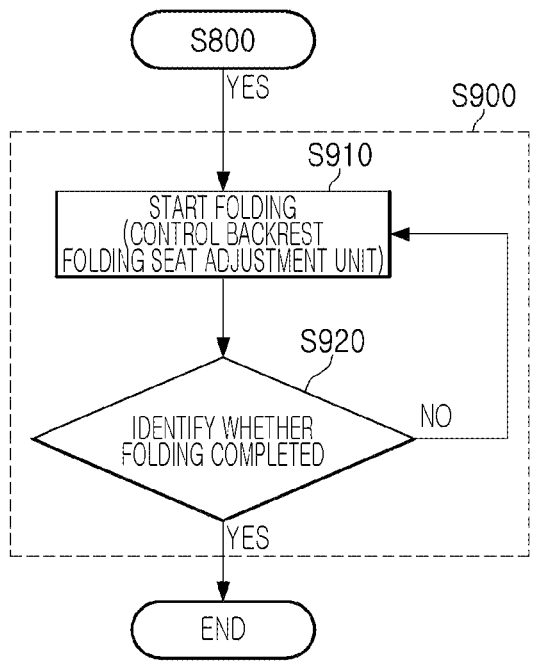
FIG. 15 is a flowchart illustrating operation S900 of a seat folding system according to an example of the present disclosure.

FIG. 7 is a flowchart illustrating controlling of a seat folding system according to an example. FIGS. 8 to 14 are flowchart illustrating various examples of operation S800 of a seat folding system according to the present disclosure. FIG. 15 is a flowchart illustrating operation S900 of a seat folding system according to an embodiment.

Referring to FIG. 7, the seat folding system according to an embodiment may be initiated by receiving a seat folding signal (S600). When a user wants to fold the folding seat 100 according to the need to load cargo in the vehicle, the user may transmit an input signal through the input unit 200 provided in the vehicle.

When a seat folding signal is input, the control unit 300 may identify whether the seat folding may be performed, that is, whether the seat folding starts (S700). Here, whether seat folding may be performed may be determined based on the state of the battery, the speed of the vehicle, the state of the transmission or a shift gear of the vehicle, the positions of the front seat 20 and rear seat 10, and/or the presence or absence of a user on the seat plate 110. For example, the control unit 300 may identify whether the state of the battery (e.g., a charge of the battery) is at a level at which the folding seat adjustment unit 400 is able to be controlled. Also, the seat folding may be for loading cargo. A person or other object may be on the seat plate 110 while the vehicle is traveling, such that, when the seat folding is initiated (e.g., due to a malfunction of the input unit 200) the object or person on the seat plate 110 may be injured damaged and/or displaced were folding to proceed. Accordingly, the control unit may determine that the seat folding may not be performed until the object and/or person is moved from the seat plate 110. Also, or alternatively, the control unit 300 may identify whether the vehicle is stopped through the speed of the vehicle and/or the state of the transmission or a shift gear of the vehicle. Also, or alternatively, by identifying the positions of the front seat 20 and the rear seat 10, it may be identified whether either the front seat 200 and/or the rear seat 10 would cause interference with the folding seat 100 when it is folded. For example, when the front seat 20 is in an adjacent position (e.g., the backrest is tilted back and/or the front seat 20 is placed in the rearward position close to the folding seat), and the folding seat 100 is folded, the headrest 140 may interfere with the front seat 20, such that folding may not be performed. The control unit 300 may identify whether the folding seat 100 is in a state in which the seat folding may be started, and when the seat folding is impossible, folding control may be terminated. Here, the control unit 300 may guide a user about circumstances in which folding of the seat is impossible by using (e.g., outputting a message to) an audio output device (e.g., a speaker) and/or a display provided in the vehicle and/or of the control unit 300.

When it is confirmed that the seat folding may be started, the folding may be prepared by the folding seat adjustment unit 400 adjusting the folding seat 100 to be in a state in which a flat surface may be formed with the folded rear seat 10 when the folding seat 100 and rear seat 10 are folded (S800). Here, the reference state may be different according to the type of vehicle or the position of the seat, and information on the reference state may be predetermined and stored depending on the type of vehicle and the position of the seat. For example, in the reference state, the front and rear position of the seat plate 110 may be a position 10 mm forward from the position of the rearmost, the height of the seat plate 110 may be 35 mm based on the lowermost end, and the storage position may be stored as a reference state as to the leg rest 130. The control unit 300 may compare the current position with the reference state and may control the folding seat adjustment unit 400 to move the seat to the reference state. Here, the control unit 300 may identify the current seat position using the counting of the motor provided in each folding seat adjustment unit and the hall sensor provided in the motor, and may move the seat to the reference state by controlling the folding seat adjustment unit based on the above information. The operation of preparing for folding may be implemented in various ways and/or comprise various example seat adjustment operations according to the configuration of the folding seat adjustment unit 400 of the vehicle.

Figure 8:
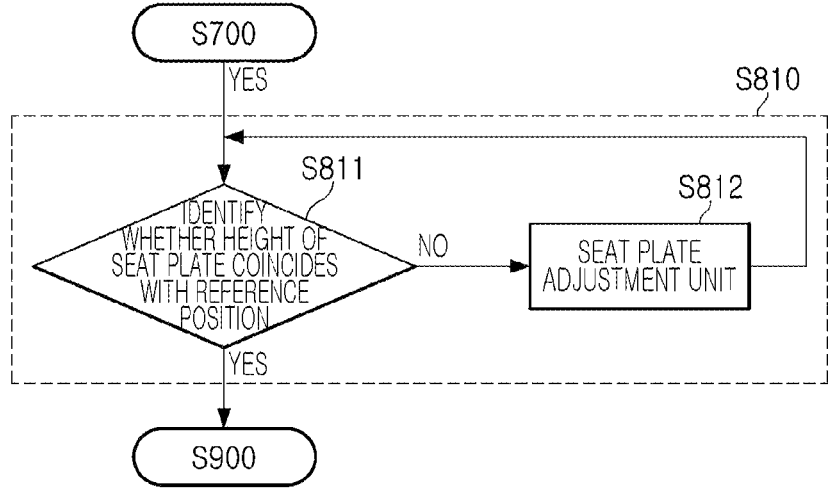
FIG. 8 is a flowchart illustrating operation S810 of a seat folding system according to an example of the present disclosure.

FIG. 8 is a flowchart illustrating operation S810 of a seat folding system according to a first example operation. Here, the first example operation may be a flowchart illustrating preparation for folding of a seat including a seat plate adjustment unit 410 and a backrest folding seat adjustment unit 440. Referring to FIG. 8, the control unit 300 may identify whether the height of the seat plate 110 is in the reference state (S811). For example, in a state in which the seat is folded, the position of the folded rear seat and the seat plate forming a flat surface with the folded rear seat may be a position raised 35 mm above the position of the lowermost end, and a position raised above 35 mm from the position of the lowermost end may be a reference state. When the height of the seat plate 110 is out of the reference state, the control unit 300 may control the seat plate adjustment unit 410 to raise or lower the seat plate 110 to the reference state (S812).

Figure 9:
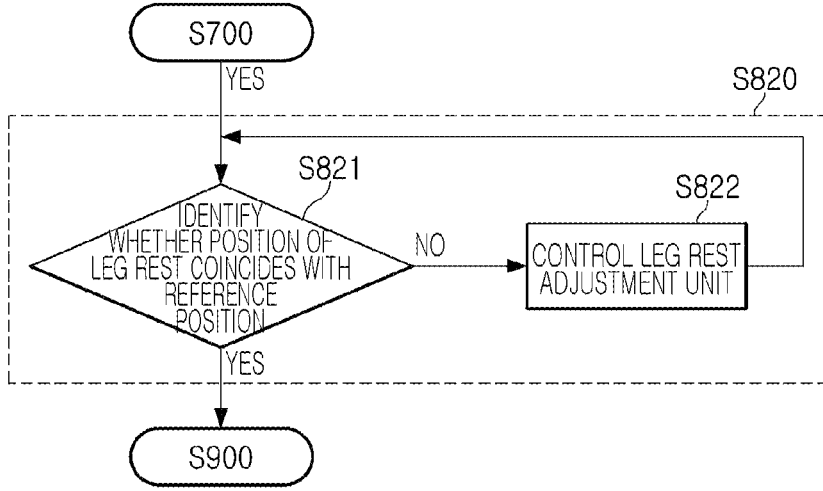
FIG. 9 is a flowchart illustrating operation S820 of a seat folding system according to an example of the present disclosure.

FIG. 9 is a flowchart illustrating operation S820 of a seat folding system according to a second example operation. The FIG. 9 flowchart illustrates preparation of folding of a seat including a leg rest adjustment unit 420 and a backrest folding seat adjustment unit 440. Referring to FIG. 9, the control unit 300 may identify whether the position of the leg rest 130 is in the reference state (S821). For example, the leg rest 130 may be stored on the lower side of the seat plate 110 when a user is not using the leg rest 130, and the position in which the leg rest 130 is stored may be referred to as a storage position. Here, the storage position may be rotated to be disposed on the lower end of the seat plate 110 using the leg rest adjustment unit 420. The control unit 300 may move the leg rest 130 to the reference state by controlling the leg rest adjustment unit 420 when the leg rest 130 is in a position other than the reference state (e.g., the storage position) (S822).

Figure 10:
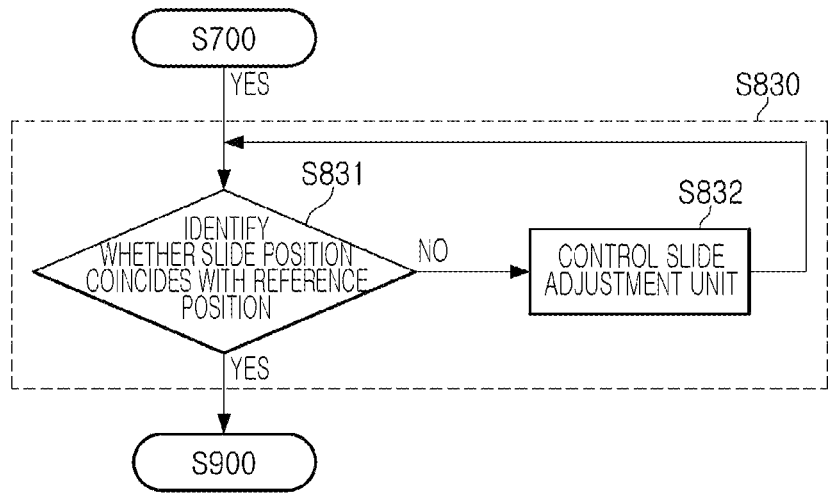
FIG. 10 is a flowchart illustrating operation S830 of a seat folding system according to an example of the present disclosure.

FIG. 10 is a flowchart illustrating operation S830 of a seat folding system according to a third example operation. The FIG. 10 flowchart illustrates preparation for folding a seat including a slide adjustment unit 430 and a backrest folding seat adjustment unit 440. Referring to FIG. 10, the control unit 300 may identify whether the slide position of the seat is in the reference state (S831). For example, when the seat is folded, a position which forms a flat surface with the folded rear seat and does not interfere with the front seat during folding may be a position 10 mm forward with respect to the rearmost position of the slide, and the position 10 mm forward from the rearmost position of the slide may be a reference state. When the current position of the slide is out of the reference state, the control unit 300 may control the slide adjustment unit 430 to move the slide forward or backward to the reference state (S832).

Figure 11:
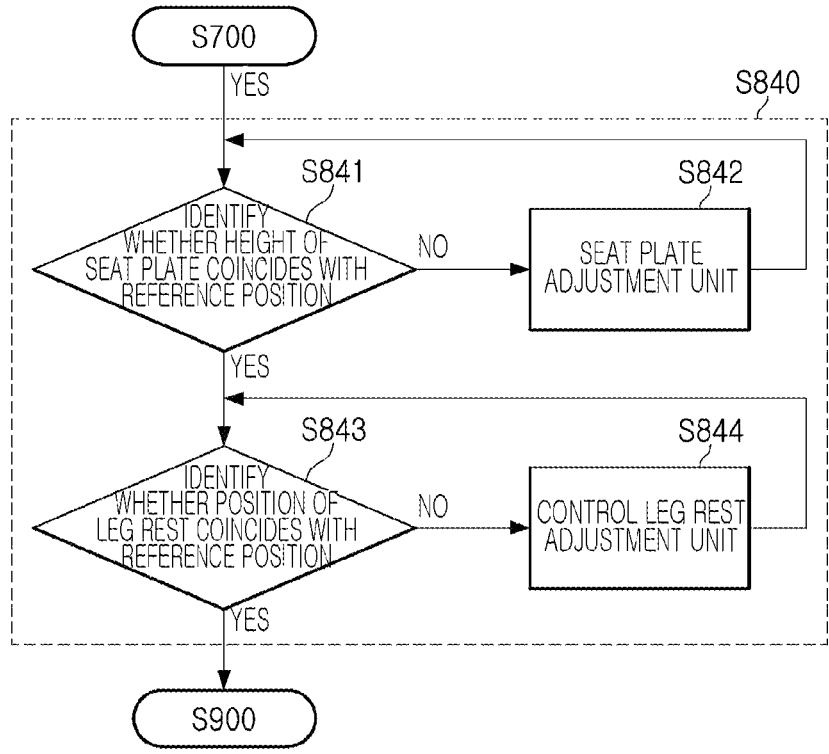
FIG. 11 is a flowchart illustrating operation S840 of a seat folding system according to an example of the present disclosure.
Figure 12:
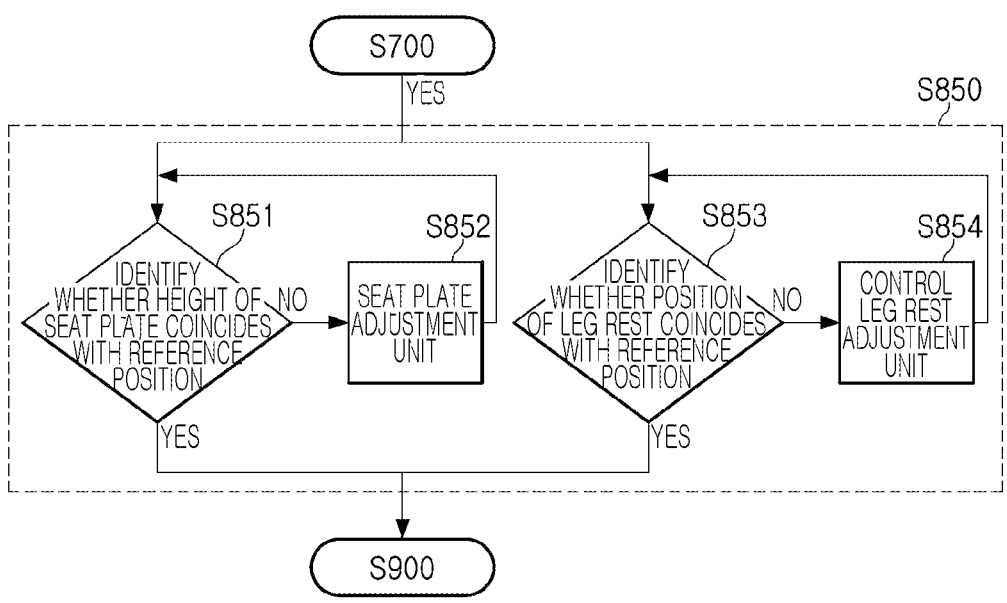
FIG. 12 is a flowchart illustrating operation S850 of a seat folding system according to an example of the present disclosure.

FIG. 11 is a flowchart illustrating operation S840 of a seat folding system according to a fourth example operation. FIG. 12 is a flowchart illustrating operation S850 of a seat folding system according to a fifth example operation. The flowcharts of FIGS. 11 and 12 each illustrate preparation for folding a seat including a seat plate adjustment unit 410, a leg rest adjustment unit 420, and a backrest folding seat adjustment unit 440. In the fourth example operation, the seat plate adjustment unit 410 and the leg rest adjustment unit 420 may be sequentially controlled, and in the fifth example operation, the seat plate adjustment unit 410 and the leg rest adjustment unit 420 may be simultaneously controlled. Referring to FIG. 11, the control unit 300 may identify whether the height of the seat plate 110 is in the reference state (S841). For example, the control unit 300 may predetermine and/or store the position in which the flat surface is formed with the folded rear seat 10 as a reference state in the state in which the seat is folded, and may compare the information with the current height of the seat plate 110. When the height of the seat plate 110 is out of the reference state, the control unit 300 may control the seat plate adjustment unit 410 to raise or lower the seat plate 110 to the reference state (S842). Thereafter, the control unit 300 may identify whether the position of the leg rest 130 is in the reference state (S843). For example, when the leg rest 130 is not in use by the user (e.g., not raised), a position at the lower end of the leg rest 130 may be stored as a reference state, and the current position of the leg rest 130 (e.g., of the lower end of the leg rest 130) may be compared with the reference state. The control unit 300 may move the leg rest 130 to the reference state by controlling the leg rest adjustment unit 420 when the leg rest 130 is in a position other than the reference state (e.g., the storage position). (S843). In the above example, the seat plate adjustment unit 410 may be adjusted first and the leg rest adjustment unit 420 may then be adjusted. Also, or alternatively, the seat plate adjustment unit 410 may be adjusted after adjusting the leg rest 130 first. Also, as illustrated in FIG. 12, the seat plate adjustment unit 410 and the leg rest adjustment unit 420 may be simultaneously controlled. Also, the fourth and fifth example operations have been described with reference to the folding seat 100 including the seat plate adjustment unit 410, the leg rest adjustment unit 420, and the backrest folding seat adjustment unit 440, and as for the seat including the seat plate adjustment unit 410, the leg rest adjustment unit 420, and the backrest folding seat adjustment unit 440, the first and third example operations may be applied additionally or alternatively to the fourth and fifth example operation, and as for a seat including the leg rest adjustment unit 420, the slide adjustment unit 430 and the backrest folding seat adjustment unit 440, the seat may be folded by applying the second and third example operations additionally or alternatively to the fourth and fifth example operations.

Figure 13:
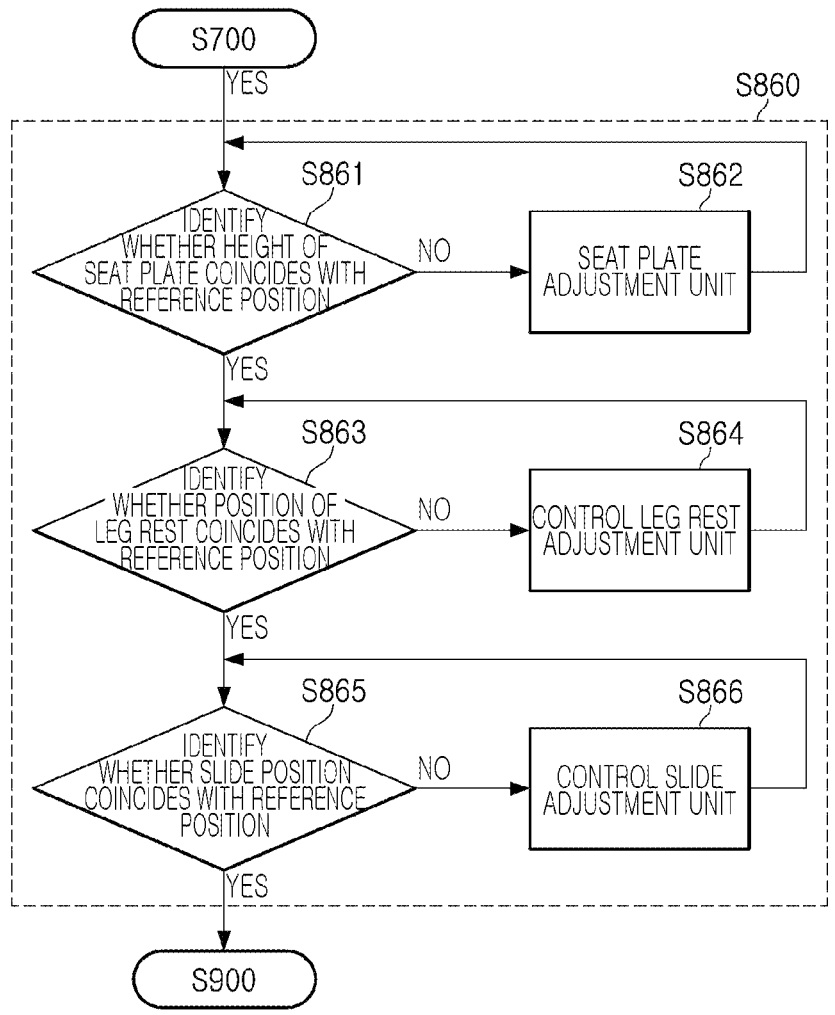
FIG. 13 is a flowchart illustrating operation S860 of a seat folding system according to an example of the present disclosure.

FIG. 13 is a flowchart illustrating operation S860 of a seat folding system according to a sixth example operation. FIG. 14 is a flowchart illustrating operation S870 of a seat folding system according to a seventh example operation. Here, the sixth and seventh embodiments may be a flowchart illustrating preparation for folding a seat including a seat plate adjustment unit 410, a leg rest adjustment unit 420, a slide adjustment unit 430, and a backrest folding seat adjustment unit 440. In the sixth example operation, the seat plate adjustment unit 410, the leg rest adjustment unit 420 and the slide adjustment unit 430 are sequentially controlled. In the seventh embodiment, the seat plate adjustment unit 410, the leg rest adjustment unit 420, and the slide adjustment unit 430 are simultaneously controlled.

Referring to FIG. 13, the control unit 300 may identify whether the height of the seat plate 110 is in the reference state (S861). For example, the control unit 300 may predetermine and store the position in which the flat surface is formed with the folded rear seat in a state in which the seat is folded as a reference state (e.g., 35 mm from the lowermost end position), and the information may be compared with the height of the current seat plate 110. When the height of the seat plate 110 is out of the reference state, the control unit 300 may control the seat plate adjustment unit 410 to raise or lower the seat plate 110 to the reference state (S862). Thereafter, the control unit 300 may identify whether the position of the leg rest 130 is in the reference state (S863). For example, when the leg rest 130 is not in use by the user, a position stored at the lower end of the leg rest 130 may be a reference state, and the current position of the leg rest 130 may be compared with the reference state. The control unit 300 may move the leg rest 130 to the reference state by controlling the leg rest adjustment unit 420 when the leg rest 130 is in a position other than the reference state (e.g., the storage position) (S864). The control unit 300 may identify whether the slide position of the seat is in the reference state (S865). For example, in a state in which the folding seat 100 is folded, a reference state (e.g., 10 mm forward compared to the rearmost position of the slide) in which a flat surface is formed with the folded rear seat 10, and no interfere with the front seat occurs during folding and may be predetermined and stored, and the current slide position may be compared with the reference state. When the current position is out of the reference state, the control unit 300 may cause the slide to move forward or backward to the reference state by controlling the slide adjustment unit 430 (S866). In the above embodiment, the seat plate adjustment unit 410, the leg rest adjustment unit 420 and the slide adjustment unit 430 may be adjusted in sequence, but the adjustment order of the seat plate adjustment unit 410, the leg rest adjustment unit 420, and the slide adjustment unit 430 may be adjusted in various manners depending on the type of vehicle. Also, as illustrated in FIG. 14, the seat plate adjustment unit 410, the leg rest adjustment unit 420, and the slide adjustment unit 430 may be simultaneously controlled.

FIG. 15 is a flowchart illustrating operation S900 of a seat folding system according to an example of the present disclosure.

When preparation for folding is complete, the folding may be initiated by controlling the backrest folding seat adjustment unit 440 (S910). The control unit 300 may identify the position of the backrest 120, and the backrest folding seat adjustment unit 440 may adjust to form a flat surface with the folded rear seat 10 by rotate the seat plate 110 and the folding may be completed (S920).

The methods according to the present disclosure may be implemented in the form of program instructions configured to be executed by various computer means (e.g., processors) and written in a computer-readable medium. The computer-readable medium may include program instructions, data files, data structures, and the like, alone or in combination. The program instructions written on the computer readable medium may be specially designed and configured for the present disclosure, or may be known and available to those skilled in the art of computer software.

Examples of computer-readable media may include hardware devices specially configured to store and carry out program instructions, such as ROM, RAM, flash memory, and the like. Examples of program instructions may include machine language codes such as those generated by a compiler, and also high-level language codes executed by a computer using an interpreter. The hardware device described above may be configured to operate as at least one software module to perform the operations of the present disclosure, and vice versa.

An aspect of the present disclosure is to provide a seat folding system in which a folding seat with an adjustable position, such as a second row seat, may folded to form a substantially flat surface with a folded surface of another seat, such as a third row seat. The present disclosure further provides a method of controlling a seat folding system.

According to an aspect of the present disclosure, a seat folding system may include a folding seat having a seat plate and a backrest, a folding seat adjustment unit having a seat plate adjustment unit for adjusting a height of the seat plate, a slide adjustment unit for adjusting a position of the seat plate in a forwards and backwards direction, and a backrest folding seat adjustment unit for adjusting an angle of the backrest, and a control unit for controlling the folding seat adjustment unit such that folding is able to start in a reference state in which the folding seat is preset.

The seat folding system may further include a rear seat disposed on a rear side of the folding seat and having a seat plate and a backrest, wherein the reference state may be a state of the folding seat in which the folding seat is able to form a flat surface with the rear seat when the folding seat and the rear seat are completely folded.

The folding seat may further include a leg rest rotatably coupled to the seat plate on the opposite side surface of the backrest and configured to supporting a user's legs, and the folding seat adjustment unit may further include a leg rest adjustment unit for adjusting an angle of the leg rest.

The seat folding system may further include an input unit for receiving states of the folding seat and the rear seat.

The seat folding system may further include a front seat disposed on a front side of the folding seat, wherein the control unit may determine whether folding of the folding seat is able to start based on states of the front seat and the rear seat.

The reference state may include information on a height of the seat plate, and a height of the seat plate may be determined based on a height of a lowermost end or an uppermost end of an adjustment range of the seat plate.

The reference state may include information on a position of the seat plate in a forwards and backwards direction, and the position of the seat plate in a forwards and backwards direction may be determined based on a rearmost position or a forwardmost position of an adjustment range of the seat plate.

According to an aspect of the present disclosure, a method of controlling a seat folding system includes an input operation of receiving seat folding signals, a preparation operation of preparing folding of a seat to place a folding seat in a predetermined reference state by controlling a folding seat adjustment unit, and a folding operation of performing folding of the folding seat.

The reference state may be a state of the folding seat in which the folding seat is able to form a flat surface with the rear seat when the folding seat and the rear seat are completely folded.

The method may further include a folding start confirmation operation of determining whether folding of the folding seat is able to be performed before performing the preparation operation.

The folding start confirmation operation may include terminating seat folding control when it is determined that folding of the folding seat is not able to be performed.

The folding start confirmation operation may further include determining whether the folding seat interferes with a front seat disposed on a front side of the folding seat when folding of the folding seat is performed, and terminating seat folding control when it is determined that the folding seat interferes with the front seat.

In the folding start confirmation operation, the determination may be based on whether a vehicle is traveling, and seat folding control may be terminated when the vehicle is traveling.

Whether the vehicle is traveling may be determined based on a speed of the vehicle or a state of a shift gear of the vehicle.

The folding seat adjustment unit may include at least one of a seat plate adjustment unit for adjusting a height of the seat plate, a slide adjustment unit for adjusting a position of the seat plate in a forwards and backwards direction, a leg rest adjustment unit for adjusting an angle of the leg rest, and a backrest folding seat adjustment unit for adjusting an angle of the backrest.

The preparation operation may include placing the folding seat in the reference state by simultaneously adjusting the folding seat adjustment unit.

The preparation operation may include placing the folding seat in the reference state by sequentially adjusting the folding seat adjustment unit.

According to the aforementioned examples, when a user folds the seat, the current state of the seat may be identified, and when the seat is folded together with the seat disposed on the rear side, the height and position of the seat may be automatically adjusted to form a continuous flat surface to easily load cargo.

While the embodiments have been illustrated and described above, it will be apparent to those skilled in the art that modifications and variations could be manufactured without departing from the scope of the present disclosure as defined by the appended claims.

What is claimed is:

1. A seat folding system, comprising:
a folding seat comprising a first seat plate and a first backrest;
a folding seat adjustment unit comprising:
a seat plate adjustment unit configured to adjust a height of the first seat plate,
a slide adjustment unit configured to adjust a position of the first seat plate in a forwards or backwards direction, wherein the forwards direction is a direction in which the first seat plate extends from the first backrest when the folding seat is in an unfolded state, and wherein the backwards direction is opposite to the forwards direction, and
a backrest adjustment unit configured to adjust an angle of the first backrest; and
a rear seat, disposed in the backwards direction relative to the folding seat, having a second seat plate and a second backrest;
a front seat disposed in the forwards direction relative to the folding seat;
an input unit for receiving information indicating a state of the folding seat, and a state of the rear seat; and
a control unit configured to control the folding seat adjustment unit to cause the folding seat to be in a preset reference state before folding of the folding seat is enabled,
wherein the reference state is a state of the folding seat in which, when the folding seat and the rear seat are folded forward, the folding seat is able to form a flat surface with the rear seat, and
wherein the control unit is configured to determine, based on the information indicating the state of the rear seat and information indicating a state of the front seat, whether folding of the folding seat is able to start.

2. The seat folding system of claim 1,
wherein the folding seat further comprises a leg rest rotatably coupled to the first seat plate on an opposite side surface of the first seat plate to a side surface of the first seat plate coupled to the first backrest, wherein the leg rest is configured to support a user's legs, and
wherein the folding seat adjustment unit further comprises a leg rest adjustment unit for adjusting an angle of the leg rest.

3. The seat folding system of claim 1, wherein the control unit is configured to control the folding seat adjustment unit to cause the folding seat to be in the preset reference state by causing the first seat plate to be at a preset height, wherein the height is determined based on a height of a lowermost end or an uppermost end of an adjustment range of the first seat plate.

4. The seat folding system of claim 1, wherein the control unit is configured to control the folding seat adjustment unit to cause the folding seat to be in the preset reference state by causing the first seat plate to be in a position in the forwards direction or the backwards direction, and wherein the position is determined based on a backwardmost position or a forwardmost position of an adjustment range of the first seat plate.

5. The seat folding system of claim 1, wherein the control unit is configured to disable at least one adjustment operation of the folding seat when the folding seat is not in the reference state and to enable the at least one adjustment operation of the folding seat when the folding seat is in the reference state.

6. The seat folding system of claim 5, wherein the at least one adjustment operation of the folding seat comprises the folding of the folding seat.

7. A seat folding system, comprising:

a first seat comprising a first seat plate and a first backrest; control circuitry configured to:

adjust a height of the first seat plate, adjust a position of the first seat plate in a forward direction or a backward direction, wherein the forward direction is a direction in which the first seat plate extends from the first backrest when the first seat is in an unfolded state, and wherein the backward direction is opposite to the forward direction, and adjust an angle of the first backrest; and a second seat disposed in the forward direction relative to the first seat or in the backward direction relative to the first seat, the second seat comprising a second seat plate and a second backrest, wherein the control circuitry is configured to disable at least one adjustment operation of the first seat when the first seat is not in a reference state and to enable the at least one adjustment operation of the first seat when the first seat is in the reference state, wherein the reference state is a state of the first seat in which, when the first seat and the second seat are folded forward, the first seat is able to form a flat surface with the second seat, and wherein the control circuitry is configured to determine, based on information indicating a state of the second seat, whether the at least one adjustment operation of the first seat is able to start.

8. The seat folding system of claim 7, wherein the second seat is a rear seat disposed at a rea row behind the first seat.

9. The seat folding system of claim 7, further comprising: a front seat disposed in the forward direction relative to the first seat and the second seat.

10. The seat folding system of claim 9, wherein the control circuitry is configured to:

determine, based on information indicating the state of the second seat and information indicating a state of the front seat, whether folding of the first seat is able to start.

11. The seat folding system of claim 7, wherein the control circuitry is configured to receive, via an interface, at least one of:

information indicating the state of the second seat, or information indicating the state of the first seat.

\* \* \* \* \*